(12) United States Patent
Kishida (10) Patent No.: US 6,861,973 B2
(45) Date of Patent: Mar. 1, 2005

(54) METHOD OF STORING DATA IN RADAR USED FOR VEHICLE

(75) Inventor: Masayuki Kishida, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 0 days.

(21) Appl. No.: 10/435,821

(22) Filed: May 12, 2003

(65) Prior Publication Data

US 2003/0222812 A1 Dec. 4, 2003

(30) Foreign Application Priority Data

Jun. 4, 2002 (JP) ........................................ 2002-163057

(51) Int. Cl.$^7$ ............................................. G01S 13/42
(52) U.S. Cl. .......................... 342/109; 342/70; 342/71; 342/115; 342/195
(58) Field of Search ............................. 342/70, 71, 72, 342/109, 115, 195; 701/301

(56) References Cited

U.S. PATENT DOCUMENTS

| | | | | |
|---|---|---|---|---|
| 4,851,850 A | * | 7/1989 | Milan et al. ................... | 342/90 |
| 5,268,692 A | * | 12/1993 | Grosch et al. ................. | 342/70 |
| 5,291,199 A | * | 3/1994 | Overman et al. .............. | 342/13 |
| 5,612,699 A | * | 3/1997 | Yamada ......................... | 342/70 |
| 5,638,281 A | * | 6/1997 | Wang ............................ | 701/301 |
| 5,793,325 A | * | 8/1998 | Yamada ......................... | 342/70 |
| 6,018,309 A | * | 1/2000 | Mitsumoto et al. .......... | 342/109 |

FOREIGN PATENT DOCUMENTS

| JP | A-9-80149 | 3/1997 |
|---|---|---|
| JP | A-10-206532 | 8/1998 |

* cited by examiner

*Primary Examiner*—Thomas H. Tarcza
*Assistant Examiner*—Isam Alsomiri
(74) *Attorney, Agent, or Firm*—Fogg and Associates, LLC; Laura A. Ryan (57) ABSTRACT

Disclosed is a method of storing data for temporarily storing a plurality of detected data in a data buffer or the like included in a radar used for a vehicle. The radar detects signals reflected from a plurality of target objects so as to obtain a plurality of detected data, and detects the presence of the plurality of target objects on the basis of the plurality of detected data. According to the above method, when a plurality of detected data, which has been detected by the radar, is temporarily stored in a data storage unit, priorities are assigned to the plurality of detected data, depending on whether target objects associated with the plurality of detected data are moving target objects or static target objects, or depending on whether or not the target objects are target objects located in closer position to a moving vehicle, or depending on whether or not the target objects are target objects located in a lane in which the moving vehicle is traveling, or depending on whether or not the target objects are target objects in which a probability of the presence is higher.

7 Claims, 7 Drawing Sheets

METHOD OF STORING DATA IN RADAR USED FOR VEHICLE

This application claims priority to Japanese Patent Application No. JP-2002-163057 filed on Jun. 4, 2002.

BACKGROUND OF THE INVENTION

1. Field of the Invention

The present invention relates to a method of storing data, which is to be implemented in a radar, used for a vehicle, that has the function of detecting the presence of a plurality of target objects located in front of a moving vehicle (driver's own vehicle), on the basis of a plurality of detected data obtained by detecting signals reflected from the plurality of target objects. In this case, the plurality of detected data is temporarily stored in a data buffer or the like for the purpose of assuredly verifying whether or not the plurality of target objects are actually present, so as to thus prevent erroneous detection of noise or the like as data representing one of these target objects.

2. Description of the Related Art

In general, a radar used for a vehicle is disposed in a moving vehicle in order to detect a plurality of target objects (or a single target object) including an obstacle located in front of the moving vehicle and another vehicle or the like, which the moving vehicle is following, according to an adaptive cruise control (ACC) method. The radar used for the vehicle, such as a frequency-modulated continuous-wave (FM-CW) radar, detects the presence of a plurality of target objects located in front of the moving vehicle by utilizing a modulated signal, such as a frequency-modulated wave.

This type of FM-CW radar transmits the modulated signal, such as the frequency-modulated wave, to the plurality of target objects located in front of the moving vehicle, and detects signals reflected from the plurality of target objects so as to obtain a plurality of detected data. Based on the plurality of detected data, the FM-CW radar calculates the distances between the moving vehicle and the plurality of target objects and the relative speeds of the moving vehicle relative to the target objects. Thus, the FM-CW radar has the function of detecting the presence of the plurality of target objects. Details of the configuration of the FM-CW radar will be described later in "DESCRIPTION OF THE PREFERRED EMBODIMENTS".

In particular, in the radar used for the vehicle, such as the FM-CW radar, if a plurality of target objects including an obstacle located in front of a moving vehicle and another vehicle or the like, which the moving vehicle is following, are present, the presence of the plurality of target objects must be detected accurately. For this purpose, it must be verified whether or not a plurality of detected data obtained by detecting signals reflected from the respective target objects has continuity, or it must be verified whether or not the target objects are actually present. A central processing unit (usually abbreviated to "CPU") included in a microcomputer is operated in order to accurately and rapidly carry out the verification mentioned above. Consequently, the plurality of detected data and data relevant to the respective detected data must be temporarily stored in a memory unit, such as a data buffer, included in the microcomputer. However, the storage capacity of the data buffer included in the microcomputer has a maximum capacity. The larger the quantity of data stored in the data buffer becomes, the longer the operating time necessary to deal with the data becomes. From this viewpoint, the storage capacity of the data buffer that can be prepared for the above-mentioned verification is restricted to a limited amount.

In a conventional method of storing detected data or the like, when the detected data or the like is stored in the data buffer included in the microcomputer incorporated in the radar used for the vehicle, such as the FM-CW radar, the highest priority is assigned to the detected data that is being continuously detected (that is, the detected data that is judged to have continuity with high possibility). Data that is newly detected is stored in the data buffer only when the data buffer has an empty area. When an existing target object recedes from the moving vehicle or passes ahead the moving vehicle, the target object is not detected any longer. In this case, detected data stored in the data buffer is cancelled in order to obtain an empty area in the data buffer (please refer to, typically, Japanese Unexamined Patent Publication (Kokai) Nos. 9-80149 and 10-206532).

However, according to the foregoing conventional method, if numerous target objects are present around a moving vehicle, the data buffer included in the microcomputer has no empty area. It takes much time, relatively, to verify whether or not the newly detected numerous target objects are actually present and to accurately detect the presence of the target objects. This results in the delay in the detection of the target objects that is currently necessary for smoothly traveling the moving vehicle. Consequently, the time delay in detecting the target objects causes a delay in controlling the moving vehicle utilizing a conventional ACC (Adaptive Cruise Control) system.

SUMMARY OF THE INVENTION

Accordingly, an object of the present invention is to provide a method of storing data in a radar used for a vehicle in which, even when numerous target objects are present around a moving vehicle, neither a time delay in detecting a given target object, nor a delay in controlling the moving vehicle, occurs.

In order to attain the above object, the present invention provides a method of storing data in a radar used for a vehicle, in which the radar transmits a predetermined signal to a plurality of target objects located in front of a moving vehicle, and detects signals reflected from the plurality of target objects, so as to obtain a plurality of detected data, and calculates at least the distances between the moving vehicle and the plurality of target objects and the relative speeds of the moving vehicle relative to the plurality of target objects, on the basis of the plurality of detected data, and thus detects the presence of the plurality of target objects. In the above method according to the present invention, the plurality of detected data, which has been detected by the radar, is temporarily stored in a data storage unit, such as a data buffer, so that it can be verified whether or not the target objects are actually present. At this time, priorities are assigned to the plurality of detected data.

Preferably, according to the method in which the present invention is implemented, when moving target objects and static target objects are present together, higher priorities are given to the moving target objects and detected data associated with the moving target objects is stored in the data storage unit.

Further, preferably, according to the method in which the present invention is implemented, if the number of the static target objects exceeds the maximum number of data permissible with the storage capacity of the data storage unit, higher priority is given to detected data associated with a static target object located in the closer position to the moving vehicle and the detected data is stored in the data storage unit.

Further, preferably, according to the method in which the present invention is implemented, higher priority is given to detected data associated with a target object located in a lane in which the moving vehicle is traveling and the detected data is stored in the data storage unit. In contrast, detected data associated with a target object located in the farther position from the current lane is not stored in the data storage unit.

Further, preferably, according to the method in which the present invention is implemented, higher priority is given to detected data associated with a target object in which a probability of the presence is higher and the detected data is stored in the data storage unit.

Further, preferably, according to the method in which the present invention is implemented, when the number of times in which any detected data has been detected exceeds a predetermined threshold, the detected data that has been settled once as data representing a corresponding target object is stored. When the number of times in which any detected data has been detected falls below a predetermined threshold, the detected data is deemed to be a candidate for data that should be replaced with newly detected data in order to store the newly detected data.

In summary, according to the present invention, a plurality of newly detected data is stored in a data storage unit, such as a data buffer, included in a radar used for a vehicle, such as an FM-CW radar. At this time, priorities are assigned to the plurality of newly detected data, depending on whether target objects associated with the plurality of detected data are moving target objects or static target objects, or depending whether or not the target objects are target objects located in closer position to a moving vehicle, or depending whether or not the target objects are target objects located in a lane in which the moving vehicle is traveling, or depending on whether or not the target objects are target objects in which a probability of the presence is higher.

When the number of times in which any detected data already stored in the data storage unit, such as a data buffer, has been detected falls below a predetermined threshold, the detected data is deemed to be no longer necessary. Further, the detected data is replaced with newly detected data immediately.

According to the present invention, the necessity of a plurality of newly detected data detected by a radar used for a vehicle, such as an FM-CW radar, can be clarified. Further, detected data associated with a target object, that has a high possibility for becoming a subject of control in accordance with which a moving vehicle must be controlled, can be stored with higher priority in the data storage unit. Moreover, the necessity of a plurality of detected data already stored in the data storage unit also can be clarified. Even when numerous target objects are present around the moving vehicle, neither a time delay in detecting a given target object, nor a delay in controlling the moving vehicle, will occur.

BRIEF DESCRIPTION OF THE DRAWINGS

The above object and features of the present invention will be more apparent from the following description of some preferred embodiments with reference to the accompanying drawings, wherein.

DESCRIPTION OF THE PREFERRED EMBODIMENTS

Hereinafter, the description of some preferred embodiments according to the present invention will be given with reference to the accompanying drawings (FIG. 1 to FIG. 8).

Figure 1:
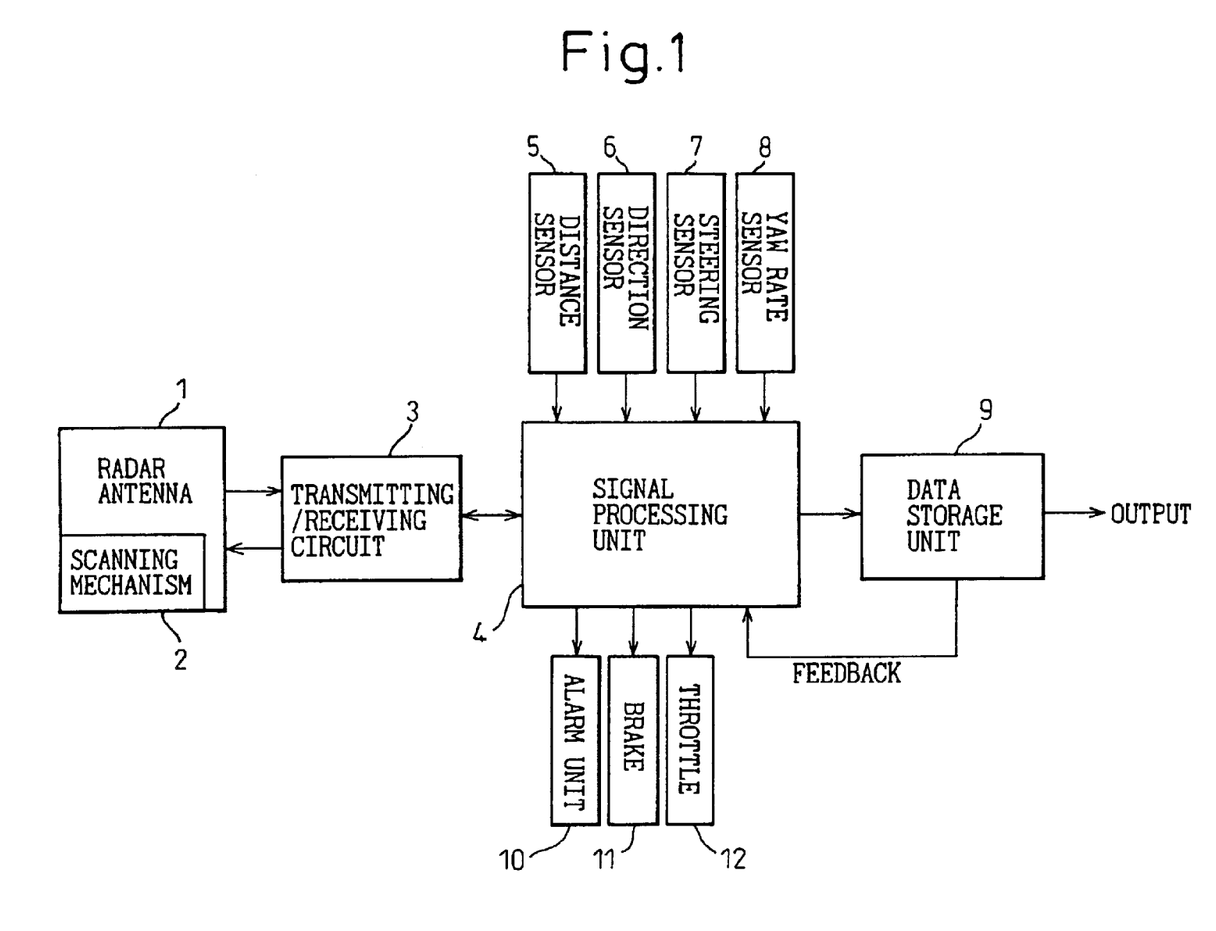
FIG. 1 is a block diagram showing an example of a configuration of a target object detecting system that is used to implement a method according to the present invention therein.

FIG. 1 is a block diagram showing an example of a configuration of a target object detecting system utilizing a radar used for a vehicle (for example, a scanning type FM-CW radar) to which the method according to the present invention is applied. Here, the typical configuration of the target object detecting system, that is used to implement the method of detecting data in a radar used for a vehicle according to the present invention, is shown schematically.

The target object detecting system shown in FIG. 1 includes a radar used for a vehicle, such as a scanning type FM-CW radar that detects, according to an ACC system, a plurality of target objects (or a single target object) including an obstacle located in front of a moving vehicle (that is, driver's own vehicle) and another vehicle which the moving vehicle is following. For this purpose, the radar uses a modulated signal, such as a frequency-modulated wave, to detect the presence of the plurality of targets located in front of the moving vehicle. The main part of the radar consists of a radar sensor unit including a radar antenna 1, a scanning mechanism 2, and a transmitting/receiving circuit 3; and a signal processing unit 4 that processes signals detected by the radar sensor unit so as to detect whether or not the target objects are actually present.

More specificically, the radar antenna 1 has the function of transmitting a modulated signal, such as a frequency-modulated wave, to a plurality of target objects (or a single target object) located in front of a moving vehicle and also detecting signals reflected from the target objects. The scanning mechanism 2 has the function of sequentially irradiating a beam containing the modulated signal to the plurality of target objects at a predetermined angle relative to the plurality of target objects, in response to a control signal sent from the signal processing unit 4. The transmitting/receiving circuit 3 has the function of amplifying the modulated signal sent from the signal processing unit 4, and also transmitting the resultant modulated signal to the radar antenna 1. Moreover, the transmitting/receiving circuit 3 has the function of amplifying a control signal sent from the signal processing unit 4 and also transmitting the resultant control signal to the scanning mechanism 2. Moreover, the transmitting/receiving circuit 3 has the function of amplifying signals detected by the radar antenna 1 and also transmitting the resultant signals to the signal processing unit 4. The signal processing unit 4 has the function of calculating the distances between the moving vehicle and the plurality of target objects and the relative speeds of the moving vehicle relative to the plurality of target objects, on the basis of a plurality of detected data obtained by the signals amplified by the transmitting/receiving circuit 3, and thus detecting whether or not the target objects are actually present.

On the other hand, the signal processing unit 4 has the function of receiving, in addition to a signal sent from the transmitting/receiving circuit 3, signals sent from a distance sensor 5, a direction sensor 6, a steering sensor 7, and a yaw rate sensor 8, so as to control an alarm unit 10, a brake 11, and a throttle 12. The distance sensor 5, such as a vehicle speed sensor, detects a mileage driven by a vehicle, on the basis of the number of rotations made by wheels. The direction sensor 5, such as a gyro magnetic sensor, detects the direction of a vehicle by utilizing geomagnetism. The steering sensor 7 detects an inclination of a vehicle travelling along a curve. The yaw rate sensor 8 detects the degree of yaw made by a moving vehicle. Preferably, the signal processing unit 4 is constituted by a CPU included in a microcomputer or the like.

Furthermore, when a plurality of target objects including a plurality of obstacles located in front of a moving vehicle and other vehicles which the moving vehicle is following, the presence of the plurality of target objects must be detected accurately in order to carry out various kinds of control including inter-vehicle distance control for the moving vehicle. For this purpose, the signal processing unit 4 is requested to accurately and rapidly verify the continuity of a plurality of detected data sent from the transmitting/receiving circuit 3 or verify whether or not the plurality of target objects are actually present.

In the target object detecting system shown in FIG. 1, in order to meet the above request, a data storage unit 9 is disposed in which a plurality of detected data and data relevant to the respective detected data are temporarily stored, so that the continuity of the detected data can be verified or it can be verified whether or not the plurality of target objects are actually present. Preferably, the data storage unit 9 is constituted by a memory unit, such as a data buffer (please refer to FIG. 2), included in a microcomputer. Incidentally, a memory unit, such as a random access memory (RAM) or a read-only memory (ROM) incorporated in a CPU may be adopted as the data storage unit 9. Information concerning the detected data that has already been preserved can be read from the data storage unit 9 and can be fed back to the signal processing unit 9.

As mentioned above, according to the conventional method of storing data, especially when numerous target objects are present around a moving vehicle, the following disadvantage occurs. Namely, as the data storing unit has no empty area, it takes much time to accurately detect the presence of the numerous newly-detected target objects.

In the method of storing data according to the present invention, in order to overcome the above disadvantage, when a plurality of newly detected data is stored in the data storage unit 9 included in the target object detecting system having the configuration shown in FIG. 1, priorities are assigned to the plurality of detected data, respectively.

More specifically, in the method of storing data according to the present invention, when a plurality of newly detected data is concerned with both moving target objects and static target objects which are present together, higher priorities are given to the detected data associated with the moving target objects and the above detected data is stored in the data storage unit 9. When the number of the detected data associated with the static target objects exceeds the maximum number of data permissible with the storage capacity of the data storage unit 9, higher priority is given to detected data associated with a target object which is verified to be located in the closer position to a moving vehicle and the above detected data is stored in the data unit 9. Moreover, higher priorities are given to detected data associated with a target object, which is verified to be located in a lane in which the moving vehicle is traveling (i.e., the current lane in which the driver's own vehicle is traveling), among the moving target objects or static target objects, and the above detected data is stored in the data storage unit 9. Moreover, higher priority is given to detected data associated with a target object in which a probability of the presence is verified to be higher and the above detected data is stored in the data storage unit 9.

On the other hand, when the number of times in which detected data already stored in the data storage unit 9 has been detected falls below a predetermined threshold, the detected data is deemed to be no longer necessary. Further, the detected data is replaced with specific newly detected data having the highest priority among all the newly detected data.

Figure 2:
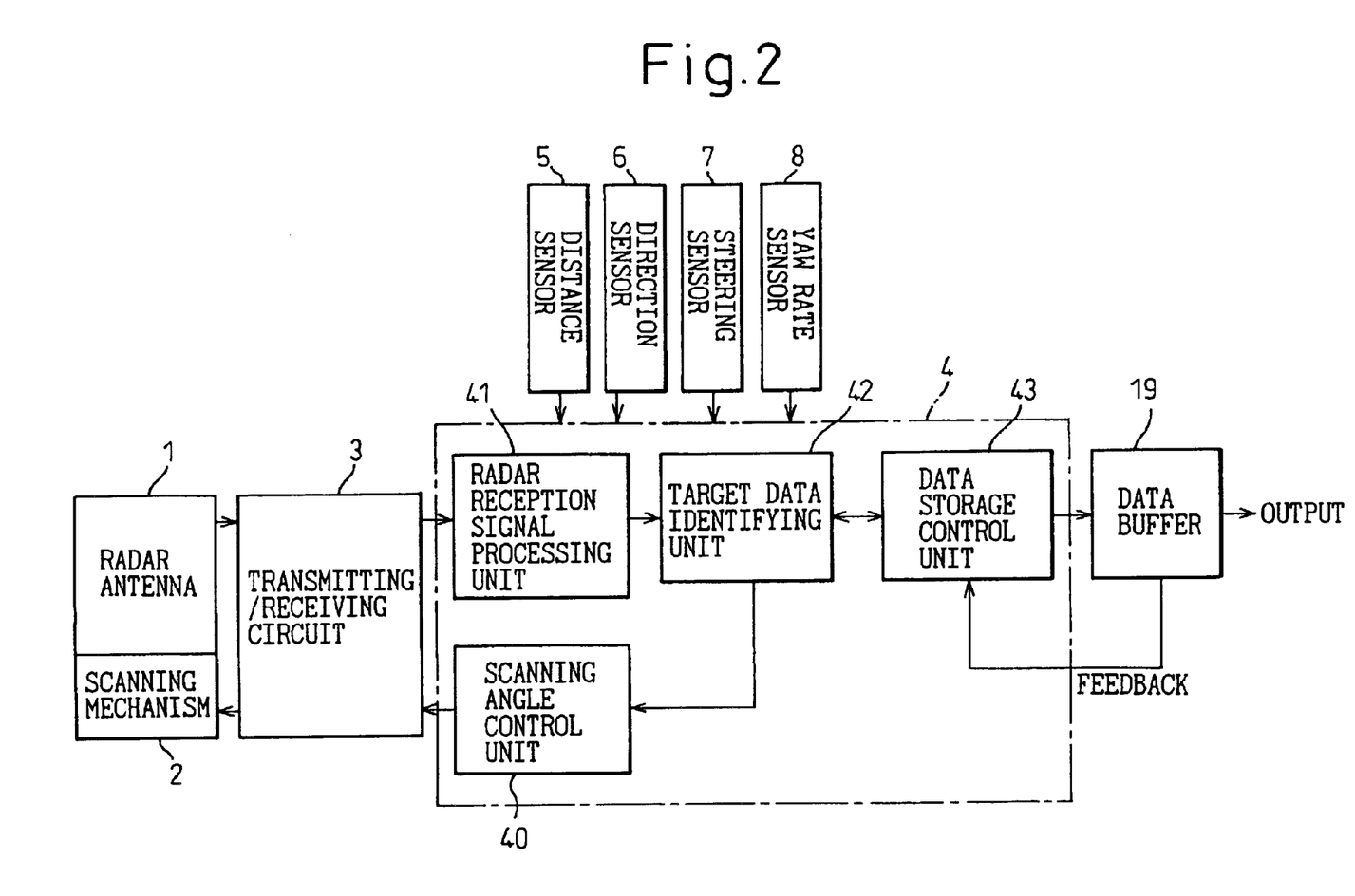
FIG. 2 is a block diagram showing a concrete example of a configuration of a signal processing unit shown in FIG. 1.

FIG. 2 is a block diagram showing a concrete example of a configuration of the signal processing unit shown in FIG. 1. Hereinafter, the same reference numerals will be assigned to components identical to the aforesaid components.

Referring to FIG. 2, the signal processing unit 4 includes a scanning angle control unit 40, a radar reception signal processing unit 41, a target data identifying unit 42, and a data storage control unit 43. Herein, the radar reception signal processing unit 41 carries out a Fast Fourier Transform (FFT) concerning reflected signals, that is, signals reflected from a plurality of target objects and transmitted via the radar antenna 1 and transmitting/receiving circuit 3 (i.e., a plurality of detected data). The radar reception signal processing unit 41 detects the power spectra of the respective reflected signals so as to calculate the distances between a moving vehicle and the target objects and the relative speeds of the moving vehicle relative to the target objects. The radar reception signal processing unit 41 then transmits the calculated data to the target data identifying unit 42.

The target data identifying unit 42 informs the scanning angle control unit 40 of a scanning angle, on the basis of the distances between the moving vehicle and the target objects and the relative speeds of the moving vehicle relative to the target objects, which are received from the radar reception signal processing unit 41, and on the basis of vehicle information obtained by the distance sensor 5, direction sensor 6, steering sensor 7 and yaw rate sensor 8. Moreover, the target data identifying unit 42 verifies whether or not the target objects are the subject for control. More particularly, the target data identifying unit 42 has the function of verifying the continuity of a plurality of detected data sent from the transmitting/receiving circuit 3 and also verifying whether or not the plurality of target objects are actually present. The target data identifying unit 42 thus accurately detects the presence of the plurality of target objects and carries out various kinds of control including inter-vehicle distance control for the moving vehicle.

The scanning angle control unit 40 controls a scanning angle while a moving vehicle is traveling along a curve in the case of a fixed type radar, or controls the scanning angle while a scanning operation is carried out by the scanning mechanism 2 in the case of a scanning type radar. The scanning mechanism 2 sequentially irradiates a beam with a predetermined angle, in response to a control signal received from the scanning angle control unit 40, and executes the scanning operation for the target objects.

The data storage control unit 43 controls temporary storage of data sent from the target data identifying unit 42 in the data buffer 19 included in a microcomputer. In other words, the data storage control unit 43 has the function of assigning priorities to a plurality of newly detected data that is to be stored in the data buffer 19. The data buffer 19 is illustrated as an example of the data storage unit 9 shown in FIG. 1. Data sent from the target data identifying unit 42 includes a plurality of detected data and data relevant to the respective detected data (e.g., the distances between the moving vehicle and the target objects and the relative speeds of the moving vehicle relative to the target objects). In response to instructions issued from the data storage control unit 43, the data buffer 19 temporarily stores the plurality of detected data and the data relevant to the respective detected data or feeds back information concerning the data already stored to the data storage control unit 43. More particularly, the data storage control unit 43 has the function of assigning priorities to the plurality of newly detected data, that is to be stored in the data buffer 19.

More specificically, when the plurality of newly detected data is concerned with both moving target objects and static target objects, which are present together, the data storage control unit 43 gives priority to detected data associated with the moving target objects and stores the detected data in the data buffer 19. Furthermore, the data storage control unit 43 gives priority to detected data associated with a static target that is verified to be located in the closer position to a moving vehicle than the remaining static target objects, and stores the detected data in the data buffer 19. Furthermore, the data storage control unit 43 gives priority to detected data associated with a target object that is verified to be located in a lane in which the moving vehicle is traveling, among the moving target objects or static target objects, and stores the detected data in the data buffer 19. Furthermore, the data storage control unit 43 gives priority to detected data associated with a target object in which a probability of the presence is higher than that in any other target objects, and stores the detected data in the data buffer 19.

On the other hand, detected data already stored in the data buffer 19 is fed back to the data storage control unit 43. When the number of times in which the detected data has been detected is verified to fall below a predetermined threshold, the detected data is replaced with specific newly detected data having the highest priority among all the newly detected data.

Preferably, the scanning angle control unit 40, radar reception signal processing unit 41, target data identifying unit 42, and data control block 43 are constituted by a CPU included in a microcomputer or the like. In short, the method of storing data according to the present invention is realized by using software. In other words, in the above method, when a plurality of detected data detected by an FM-CW radar or the like is stored in a data buffer, priorities are assigned to the plurality of detected data, depending on whether target objects associated with the plurality of detected data are moving target objects or static target objects, or depending on whether or not the target objects are target objects located in the closer position to a moving vehicle, or depending on whether or not the target objects are target objects located in a lane in which the moving vehicle is traveling, or depending on whether or not the target objects are target objects in which a probability of the presence is higher. Consequently, even when the method of storing data according to the present invention is applied to a target object detecting system, there will be no increase in the hardware of the target object detecting system.

Preferably, the FM-CW radar employed in the system shown in FIG. 1 and FIG. 2 transmits a continuous-wave modulated signal, such as a frequency-modulated wave, which is produced by carrying out frequency modulation on a high-frequency carrier wave by using a frequency-modulating signal, such as a low-frequency triangular wave having several hundreds of hertz (200 to 300 Hz), to a target object located in front of a moving vehicle (e.g., another vehicle located in front of the moving vehicle). Based on a signal reflected from the target object, the FM-CW radar calculates the distance between a moving vehicle and the target object and the relative speed of the moving vehicle relative to the target object. In short, the FM-CW radar produces a beat-frequency signal (i.e., radar signal) by mixing a reception signal equivalent to a signal reflected from the target object located in front of the moving object and a transmission signal equivalent to a modulated signal received through the radar antenna 1.

A Fast Fourier Transform (FFT) is carried out on the beat-frequency signal, and frequency analysis is done by the FM-CW radar. The beat-frequency signal having undergone the frequency analysis exhibits a peak power that depends on the target object, and a frequency corresponding to the above peak power is referred to as the peak frequency. A signal component having the peak frequency contains information concerning the distance. Due to the Doppler effect brought about by the relative speed of a moving vehicle relative to a target object located in front of the moving vehicle, the peak frequency varies depending on whether the frequency-modulated wave modulated by a triangular wave rises or falls. Consequently, the distance between the moving vehicle and the target object located in front of the moving vehicle and the relative speed of the moving object relative to the target object can be calculated by using the peak frequencies detected at the time of the rise and the fall of the frequency-modulated wave, respectively. On the other hand, when a plurality of target objects are located in front of a moving vehicle, a pair of peak frequencies are detected relative to each of the target objects at the time of the rise and the fall of the frequency-modulated wave, respectively. Thus, the fact that a pair of peak frequencies are produced at the time of the rise and the fall of the frequency-modulated wave, respectively, is referred to as "pairing".

In the FM-CW radar system, the triangular wave is generally adopted as a frequency-modulating signal. Alternatively, any frequency-modulating signal other than the triangular wave, such as a sawtooth wave or a trapezoidal wave may be adopted.

Figure 3:
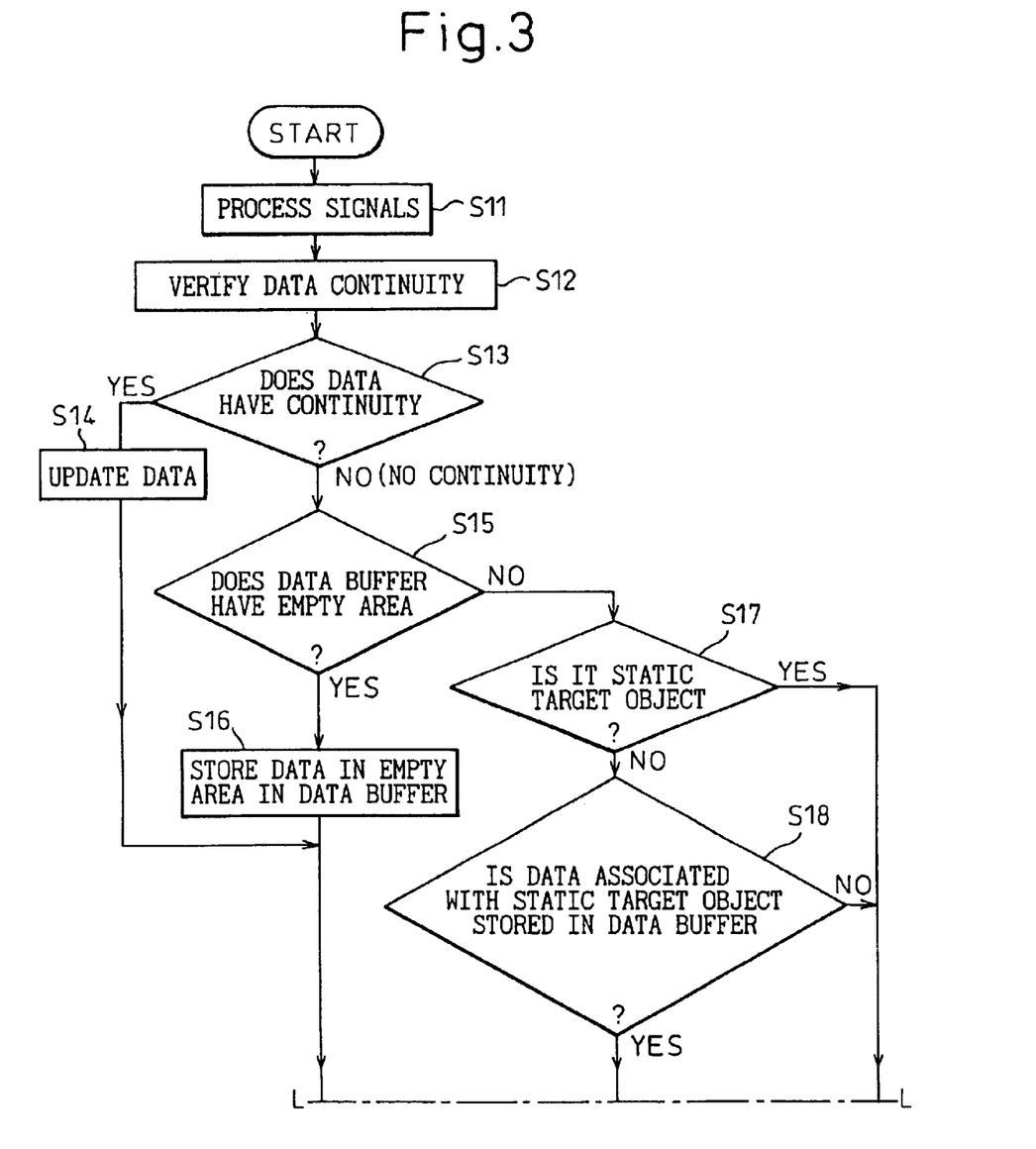
FIG. 3 is a first part of a flowchart for explaining a method of storing data in a radar used for a vehicle according to an embodiment of the present invention.
Figure 4:
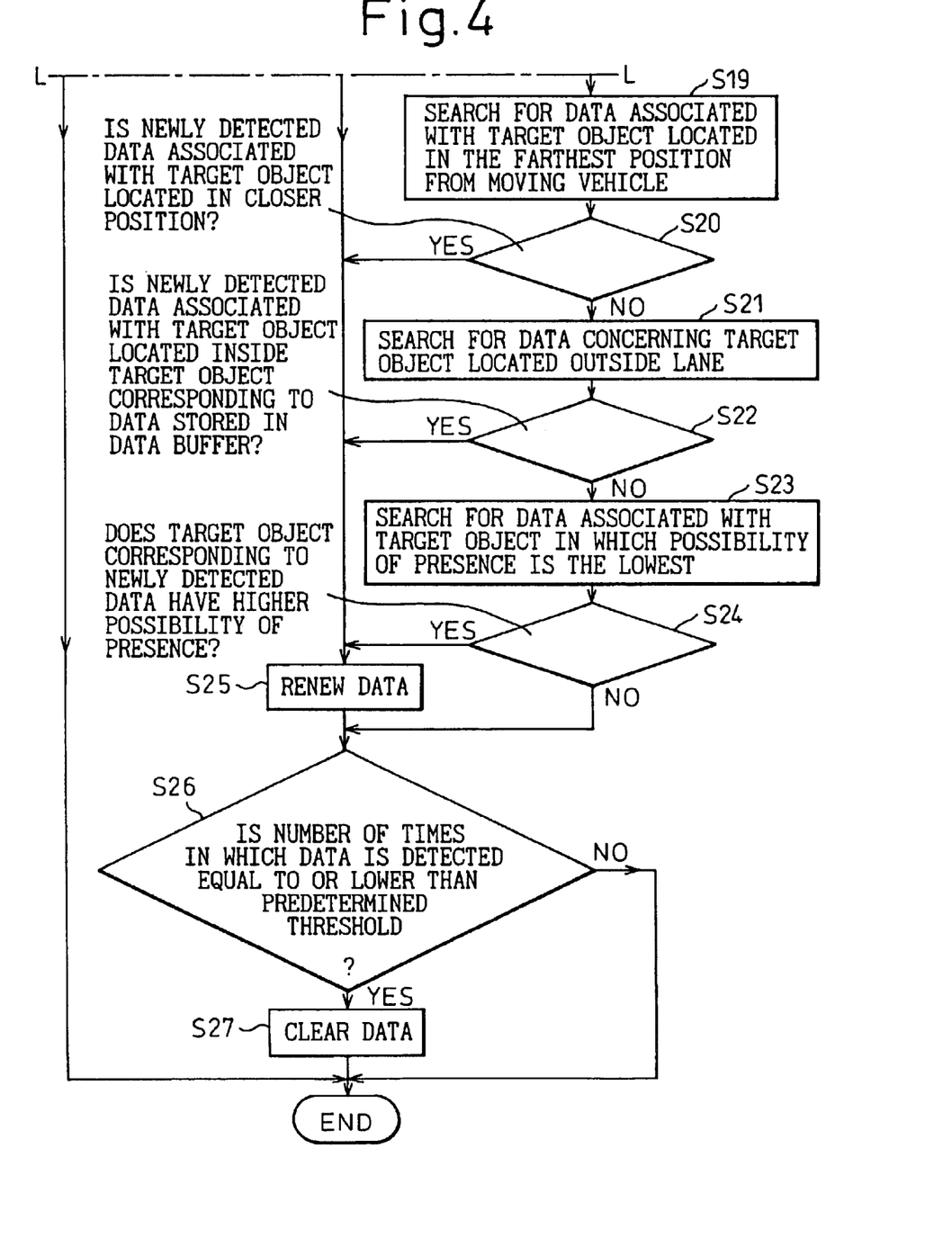
FIG. 4 is a second part of the flowchart for explaining the method of storing data in the radar used for the vehicle according to the embodiment of the present invention.

FIG. 3 and FIG. 4 are the first part and the second part of a flowchart for explaining the method of storing data in a radar used for a vehicle according to an embodiment of the present invention. Herein, an explanation will be made regarding a series of steps for storing a plurality of detected data in a data buffer by operating a CPU that serves as the signal processing unit shown in FIG. 1 or FIG. 2.

When a plurality of target objects are located in front of a moving vehicle (i.e., driver's own vehicle), signals reflected from the plurality of target objects, respectively (i.e., a plurality of detected data), are subjected to a Fast Fourier Transform, as shown in step S11 in FIG. 3. The power spectra of the resultant reflected signals are detected in order to calculate the distances between the moving vehicle and the respective target objects, the relative speeds of the moving vehicle relative to the respective target objects, and the angles of the moving vehicle with respect to the respective targets objects (It should be noted that a single target object may be located in front of the moving vehicle).

Furthermore, the continuity of past detected data already detected and stored in the data buffer and the continuity of newly detected data are checked on the basis the distances between the moving vehicle and the respective target objects, the relative speeds of the moving vehicle relative to the respective target objects, and the angles of the moving vehicle with respect to the respective target objects. It is then verified whether or not detected data associated with the target objects that are subjects for control has continuity (step S12). If it is judged that the detected data associated with target objects that are subjects for control has continuity (step S13), the detected data in the data buffer is updated (step S14).

On the other hand, if it is judged that the newly detected data associated with target objects (or a target object) that are subjects for control has no continuity (step S13), it is checked if the data buffer has an empty area (step S15). If it is judged that the data buffer still has the empty area, the newly detected data is stored in the empty area in the data buffer (step S16).

On the other hand, if it is judged that the data buffer has no empty area, it is verified whether target objects (or a target object) corresponding to the detected data, which are subjects for control, are moving target objects (or a moving target object) or static target objects (or a static target object) (step S17).

Assume that it is judged that the target objects (or a target object) corresponding to the newly detected data, which are subjects for control, are all moving target objects (or a moving target object). In this case, if detected data associated with static target objects (or a static target object) exist in the data buffer (step S18), the detected data associated with the static target objects (or a static target objects) and existing in the data buffer is replaced with the newly detected data associated with the moving target objects (or a moving target object). Thus, the detected data in the data buffer is renewed (see step S25 in FIG. 4).

Assume that the plurality of newly detected data includes both detected data associated with moving target objects and detected data associated with static target objects, which are present together. In this case, at steps S15 to S18, it is verified whether the detected data is the detected data associated with moving target objects or static target objects, and higher priority is given to the detected data associated with the moving target objects, and the detected data associated with the moving target objects is stored in the data buffer. One of the reasons why higher priority is given to the detected data associated with moving target objects is that it is relatively easy for the human eye to detect static target objects but it is often difficult for the human eye to detect moving target objects.

On the other hand, it may be judged that the target objects corresponding to the newly detected data, which are subjects for control, are all static targets. In this case, specific detected data associated with a target object located in the farthest position from the moving vehicle is, as described at step S19 in FIG. 4, searched for from among the past detected data associated with target objects and existing in the data buffer.

Furthermore, the newly detected data is compared with the searched specific detected data existing in the data buffer, in order to verify which of the two types of the detected data is the detected data associated with a target object located in the closer position to the moving vehicle (step S20). On the basis of the result of the above verification, higher priority is given to the detected data associated with the static target object that is located in the closer position to the moving vehicle than the remaining static target objects and the detected data is stored in the data buffer. One of the reasons why higher priority is given to the detected data associated with the static target object located in the closer position to the moving vehicle is that the shorter the distance between the moving vehicle and a target object becomes, the higher a possibility in which the moving vehicle may collide with the target object becomes.

More specificically, if it is judged that newly detected data is detected data associated with a target object located in the closer position to the moving vehicle, specific detected data in the data buffer is replaced with the newly detected data. Thus, the detected data in the data buffer is renewed (step S25). On the other hand, if it is judged that the specific detected data in the data buffer is detected data associated with a target object located in the closer position to the moving vehicle, the detected data in the data buffer is left intact.

Assume that it is verified, at step S18 in FIG. 3 mentioned above, that only detected data associated with moving target objects (or a moving target object) exist in the data buffer. In this case, at step S19 and step S20 in FIG. 4, specific detected data associated with a target object located in the farthest position from the moving vehicle is searched for from among the past detected data associated with moving target objects and existing in the data buffer.

Furthermore, the newly detected data is compared with the thus searched specific detected data existing in the data buffer. It is verified which of the two types of detected data is the detected data associated with a target object located in the closer position to the moving vehicle. On the basis of the result of the above verification, higher priority is given to the detected data associated with the moving target object located in closer position to the moving vehicle than the remaining moving target objects, and the detected data is stored in the data buffer.

Furthermore, it is judged that there is a relatively high possibility in which a moving vehicle (i.e., driver's own vehicle) may collide with a target object (either a static target object or a moving target object) located in a lane in which the moving vehicle is traveling. Therefore, higher priority is given to the detected data associated with the above target object and the detected data is stored in the data buffer.

Furthermore, predetermined detected data associated with a target object located in the position most outside the lane in which the moving vehicle is traveling is searched for from among the past detected data stored in the data buffer (step S21). It is then verified whether a target associated with newly detected data is located in the position inside the target object associated with the predetermined detected data (step S22). If it is judged that the target object corresponding to the newly detected data is located in the position inside the target object associated with the predetermined detected data, the predetermined detected data is replaced with the newly detected data. Thus, the detected data in the data buffer is renewed (step S25).

In short, it is judged that there is a relatively high possibility in which a moving vehicle may collide with a target object located in a lane in which the moving vehicle is traveling. Higher priority is given to the detected data associated with the above target object and the detected data is stored in the data buffer. On the other hand, detected data associated with a target object located in the farthest position from the lane in which the moving vehicle is traveling is not stored in the data buffer. If this type of detected data has already been stored in the data buffer, the above detected data is replaced with the newly detected data.

Furthermore, detected data associated with a target object in which a possibility of the presence is the lowest is searched for from among the past detected data stored in the data buffer (step S23). More particularly, a possibility in which a corresponding target object may be present is defined as a ratio of the number of times in which the detected data has been detected with respect to the total number of times in which the detection of data has been carried out, during a predetermined period, that is, the above possibility is defined as a probability in which the target object associated with may be present. Herein, the data sensing should be performed a certain number of times during the predetermined period.

Furthermore, it is verified whether or not a possibility in which a target object associated with newly detected data may be present is higher than a possibility in which a target object associated with the searched past detected data (i.e., the past detected data associated with a target object in which a possibility of the presence is the lowest) is present (step S24).

Herein, assume that it is judged that a probability in which a target object corresponding to newly detected data may be present is higher than a probability in which a target object corresponding to the past detected data, in which a possibility of the presence is the lowest, may be present. In this case, the past detected data associated with the target object in which a possibility of the presence is the lowest is replaced with the newly detected data. Thus, the detected data in the data buffer is renewed (step S25).

In short, if it is judged that a probability in which a target object corresponding to newly detected data may be present is higher than a probability in which a target object associated with the past detected data, in which a possibility of the presence is the lowest, may be present, a possibility in which the target corresponding to the newly detected data may be an obstacle to a moving vehicle is considered to be higher. Thus, higher probability is given to the newly detected data associated with the target object in which a probability of the presence is higher and the newly detected data is stored in the data buffer.

Assuming that the detection of data has been carried out a certain number of times during a predetermined period, a predetermined threshold is determined concerning the number of times in which detected data associated with a target object that is a subject for control has been detected. When the number of times in which the detected data has been detected exceeds the predetermined threshold, the detected data can be settled as data representing the target object. The thus settled detected data is stored in the data buffer in consideration of various conditions presented at steps S12 to S24.

Herein, the detection of data is continuously carried out even for the detected data, which has been settled once and has already been stored in the data buffer, a certain number of times during a predetermined period. When the number of times in which the detected data settled once has been detected falls below a predetermined threshold (step S26), the above detected data is deemed to be no longer necessary. The above detected data is cleared (or deleted) from the data buffer (step S27). Otherwise, the above detected data is kept stored in the data buffer and is deemed to be a candidate for the detected data which should be replaced with newly detected data.

In the aforesaid embodiment of the present invention, the necessity of the newly detected data is clarified. Thus, higher priority is given to the detected data having a high possibility of being regarded as a subject for control in which a moving vehicle is controlled and the detected data is stored in the data buffer. The necessity of the past detected data already stored in the data buffer is also clarified. The past detected data that is deemed to be unnecessary is replaced with the newly detected data. Even when numerous target objects are present around a moving vehicle, it is possible to prevent a time delay in detecting the target objects or a delay in controlling the moving vehicle.

Figure 5:
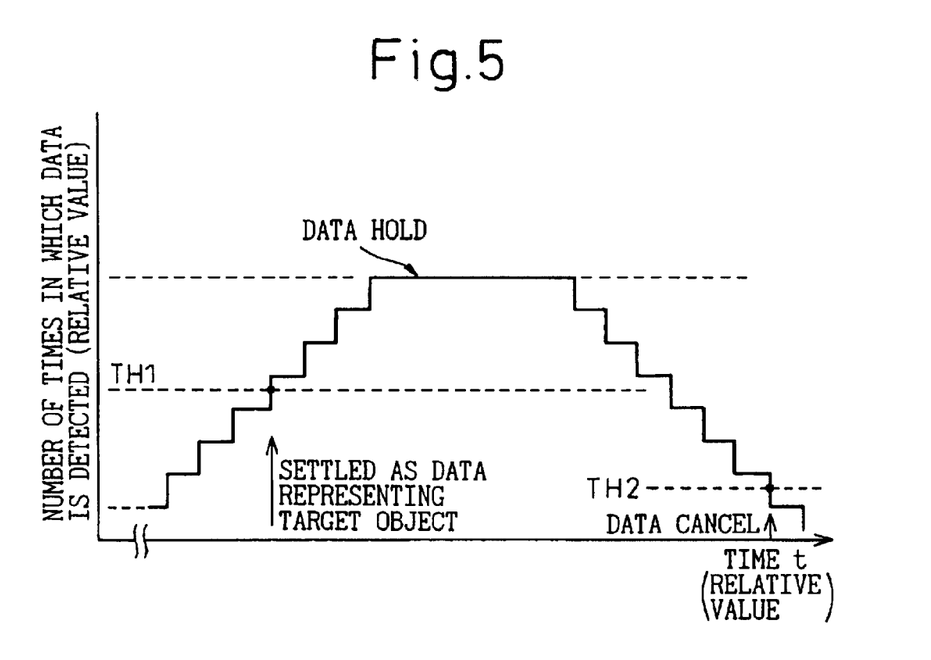
FIG. 5 is a graph showing the relationship between the number of times in which data is detected and first and second predetermined thresholds which are employed in the embodiment of the present invention.

FIG. 5 is a graph indicating the relationship between the number of times in which data is detected and first and second predetermined thresholds which are employed in the embodiment of the present invention. The graph of FIG. 5 is presented in order to explain step S26 and step S27 in FIG. 4 more concretely.

As is obvious from the graph of FIG. 5, a relative number of times of the detection of data (a relative value) in which detected data associated with a target object located in front of a moving vehicle is detected is defined as a ratio of the number of times in which the detected data has been actually detected with respect to the total number of times (e.g., ten times) in which the detection of data has been carried out during a predetermined period. Preferably, a counter incorporated in a CPU included in a microcomputer or the like counts the number of times in which the detected data has been actually detected. Referring to FIG. 5, a change in the relative number of times of the detection of data with respect to the lapse of time (t) (a relative value) is plotted.

As is apparent from the graph of FIG. 5, the shorter the distance between moving vehicle and a target object located in front of the moving vehicle becomes, the larger the relative value of the number of times of the detection of data becomes. Herein, the relative value of the number of times of the detection of data is determined so that, when the detection of data is carried out ten times during a predetermined period, the number of times in which detected data has been detected is five. The thus determined relative value is defined as a first predetermined threshold TH1. The relative value of the number of times of the detection of data increases to exceed the first predetermined threshold TH1. At this time, the detected data is settled as data representing the target object and the detected data is stored in the data buffer. When the relative value of the number of times of the detection of data reaches a certain level, the number of times of the detection of data is held at the certain level (data hold state).

On the other hand, the longer the distance between a moving vehicle and a target object located in front of of the moving vehicle becomes, the smaller the relative value of the number of times of the detection of data becomes. Herein, the relative value of the number of times of the detection of data is determined so that, when the detection of data is carried out ten times during a predetermined period, the number of times in which detected data has been detected is one. The thus determined relative value is defined as a second predetermined threshold TH2. When the relative value of the number of times of the detection of data decreases to fall below the second predetermined threshold TH1, it is judged that the target object associated with the detected data stored in the data buffer will not be regarded as a subject for control any longer. The detected data is therefore deleted from the data buffer. Alternatively, the detected data is not deleted but held in the data buffer, and then replaced with any other newly detected data at the time in which the detected data is newly detected.

Figure 6:
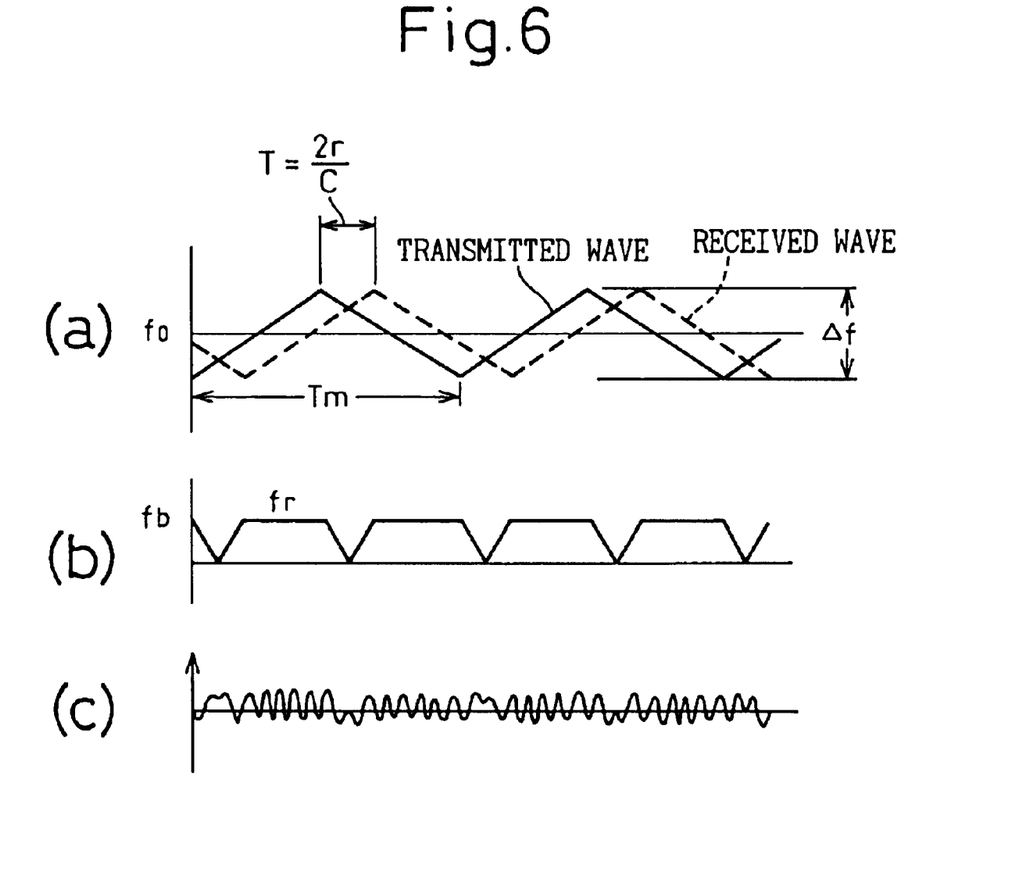
FIG. 6 is a timing chart for explaining the principles of an FM-CW radar in the case in which a relative speed of a moving vehicle relative to a target object is 0 (zero)
Figure 7:
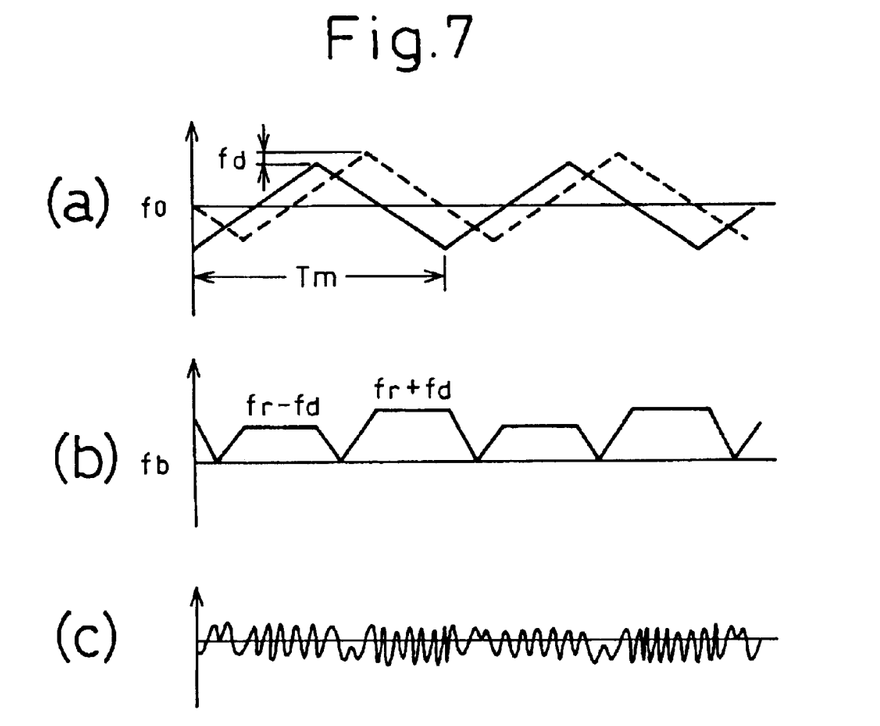
FIG. 7 is a timing chart for explaining the principles of the FM-CW radar in the case in which the relative speed of the moving vehicle relative to the target object is v.
Figure 8:
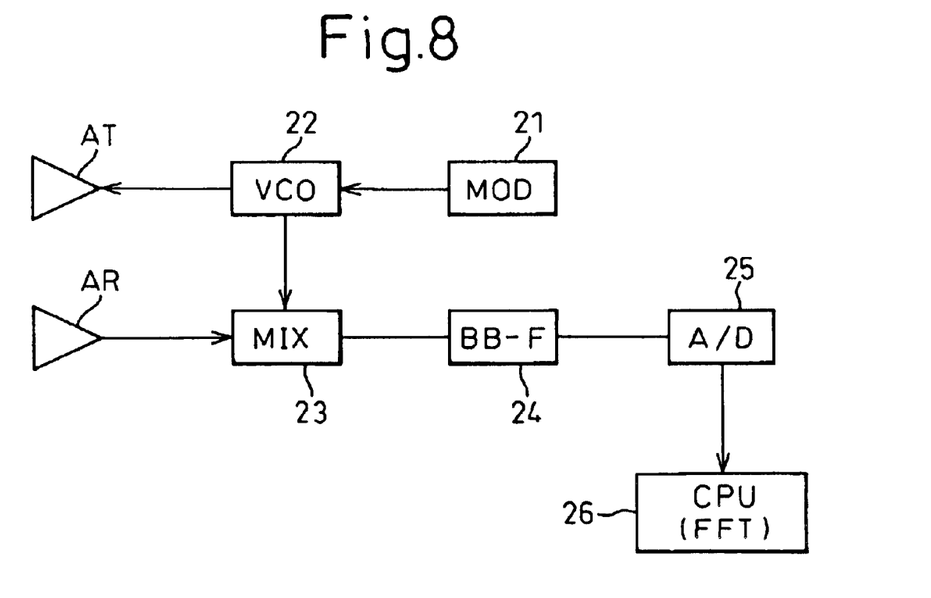
FIG. 8 is a block diagram showing an example of a configuration of an FM-CW radar to which the present invention is applied.

Referring to FIG. 6 to FIG. 8, the principles and the configuration of the FM-CW radar employed in the embodiment of the present invention will be described below.

The principles of the FM-CW radar will be described first. For example, a modulated signal, such as a frequency-modulated wave produced by carrying out frequency modulation on a high-frequency carrier wave by using a triangular wave having several hundreds of hertz, is transmitted, and a signal reflected from a target object is received. A received signal generated by a local oscillator on the basis of the received frequency-modulated wave is subjected to frequency demodulation. The received signal (or received wave) reflected from the target object undergoes a frequency difference (or frequency beat) with respect to the transmitted modulated signal (or transmitted wave), in accordance with the distance between the radar antenna and the target object and a frequency shift caused by the Doppler effect dependent on the relative speed of the moving vehicle relative to the target object. Consequently, the distance between the moving vehicle and the target object and the relative speed of the moving vehicle relative to the target object can be measured on the basis of the frequency difference mentioned above.

FIG. 6 is a timing chart for explaining the principles of the FM-CW radar in the case in which a relative speed of a moving vehicle relative to a target object is 0. As indicated with a solid line in the portion (a) of FIG. 6, a transmitted wave is a triangular wave and its frequency changes. The transmission center frequency of the transmitted wave is expressed as fo, the width of a frequency modulation is expressed as Δf, and a repetition cycle of the transmitted wave is expressed as Tm. The transmitted wave is reflected from the target object, and received through the radar antenna, and then treated as a received wave indicated with a dashed line in the portion (a) of FIG. 6. The propagation time delay T necessary for a radio wave to travel between a moving vehicle and the target object is expressed as T=2r/C, where r denotes the distance between the moving vehicle and the target object and C denotes a propagation velocity of the radio wave.

As shown in the portions (b) and (c) of FIG. 6, the received wave undergoes a frequency difference (or frequency beat) relative to the transmitted wave, in accordance with the distance between the radar antenna and the target object.

A frequency component of a beat signal generated by the frequency beat fb is expressed as follows:

$$fb = fr = (4 \cdot \Delta f / (C \cdot Tm))r \quad (1)$$

On the other hand, FIG. 7 is a timing chart for explaining the principles of the FM-CW radar in the case in which the relative speed of a moving vehicle relative to a target object is v. As indicated with a solid line in the portion (a) of FIG. 7, a transmitted wave is a triangular wave and its frequency changes. The transmitted wave is reflected from the target object, and received through the radar antenna, and then treated as a received wave indicated with a dashed line in the portion (a) of FIG. 7.

As shown in the portions (b) and (c) of FIG. 7, the received wave undergoes a frequency difference (or frequency beat) relative to the transmitted wave, in accordance with the distance between the radar antenna and the target object. In this case, as the radar antenna shows the relative speed v relative to the target object, a frequency shift occurs due to the Doppler effect. Consequently, a frequency component fb of a beat signal generated by the frequency beat and the frequency shift is expressed as follows:

$$fb = fr \pm fd \quad (2)$$
$$= (4 \cdot \Delta f / (C \cdot Tm))r \pm (2 \cdot fo / C)v$$

In the formulas (1) and (2), fb denotes the frequency component of the beat signal, fr denotes a distance indicating frequency, fd denotes a speed indicating frequency, fo denotes the transmission center frequency of the transmitted wave, Δf denotes the width of the frequency modulation, Tm denotes the repetition cycle of the transmitted wave, C denotes the velocity of light (or propagation velocity of a radio wave), T denotes the propagation time delay necessary for a radio wave to travel between the moving vehicle and the target object, r denotes the distance between the moving vehicle and the target object, and v denotes the relative speed of the moving vehicle relative to the target object.

FIG. 8 is a block diagram showing an example of the configuration of the FM-CW radar to which the present invention is applied. As shown in FIG. 8, a modulating signal generator 21 (abbreviated to MOD in FIG. 8) applies a modulating signal to a voltage-controlled oscillator (abbreviated to VCO in FIG. 8) 22 in order to carry out frequency modulation. A modulated signal resulting from the frequency modulation is transmitted to a target object, such as another vehicle located in front of the moving vehicle, through a transmission antenna AT (a part of the radar antenna). Moreover, a part of the modulated signal that is transmitted is branched out and applied to a frequency converter (abbreviated to MIX in FIG. 8) 23, such as a mixer.

On the other hand, a signal reflected from the target object, such as another vehicle located in front of the moving vehicle, is received through a reception antenna AR (a part of the radar antenna). The frequency converter 23 mixes the received signal with an output signal of the voltage-controlled oscillator 22, whereby a beat signal is produced. The beat signal is transmitted to an analog-to-digital converter (abbreviated to A/D in FIG. 8) 25 via a baseband filter (abbreviated to BB-F in FIG. 8) 24. The analog-to-digital converter 25 converts the beat signal by means of analog-to-digital conversion. Furthermore, a CPU 26 processes the beat signal by carrying out a Fast Fourier Transform (FFT) or the like and calculates the distance between the moving vehicle and the target object and the relative speed of the moving vehicle relative to the target object.

As described above, according to the preferred embodiment of the present invention, the necessity of a plurality of newly detected data detected by the radar used for the moving vehicle, such as an FM-CW radar, can be clarified. Higher priority is given to the detected data having a high possibility for becoming a subject for control in accordance with which the moving vehicle must be controlled, and the above detected data is stored in a data storage unit. Moreover, the necessity of a plurality of detected data already stored in the data storage unit also can be clarified. Detected data that is deemed to be no longer necessary in the data storage unit is replaced with the newly detected data immediately. Even when numerous target objects are present around the moving vehicle, neither a time delay in detecting a given target objects, nor a delay in controlling the moving vehicle, will occur.

What is claimed is:

1. A method of storing data in a radar used for a vehicle, in which said radar transmits a predetermined signal to a plurality of target objects located in front of a moving vehicle, and detects signals reflected from the plurality of target objects, so as to obtain a plurality of detected data, and calculates at least the distances between said moving vehicle and the plurality of target objects and the relative speeds of said moving vehicle relative to the plurality of target objects, on the basis of the plurality of detected data, and thus detects the presence of the plurality of target objects, wherein, when the plurality of detected data is temporarily stored in a data storage unit in order to verify whether or not the plurality of target objects are actually present, priorities are assigned to the plurality of detected data;

wherein, when moving target objects and static target objects are present together, higher priorities are given to said moving target objects and detected data associated with said moving target objects is stored in said data storage unit; and wherein, when the number of said static target objects exceeds the maximum number of data permissible with the storage capacity of said data storage unit, higher priority is given to detected data associated with a static target object located in the closer position to said moving vehicle and said detected data is stored in said data storage unit.

2. A method according to claim 1, wherein higher priority is given to detected data associated with a target object located in a lane in which said moving vehicle is traveling and said detected data is stored in said data storage unit, while detected data associated with a target object located in the farther position from said lane is not stored in said data storage unit.

3. A method according to claim 1, wherein higher priority is given to detected data associated with a target object in which a probability of the presence is higher and said detected data is stored in said data storage unit.

4. A method according to claim 1, wherein, when the number of times in which any detected data has been detected exceeds a predetermined threshold, said detected data that has exceeded the threshold and that has been settled once as data representing a corresponding target object is stored, and when the number of times in which any detected data has been detected falls below the predetermined threshold, said detected data that falls below the threshold is deemed to be a candidate for data that should be replaced with newly detected data in order to store said newly detected data.

5. A method according to claim 1, wherein higher priority is given to detected data associated with a target object located in a lane in which said moving vehicle is traveling and said detected data is stored in said data storage unit, while detected data associated with a target object located in the farther position from said lane is not stored in said data storage unit.

6. A method according to claim 1, wherein higher priority is given to detected data associated with a target object in which a probability of the presence is higher and said detected data is stored in said data storage unit.

7. A method according to claim 1, wherein, when the number of times in which any detected data has been detected exceeds a predetermined threshold, said detected data that has exceeded the threshold and that has been settled once as data representing a corresponding target object is stored, and when the number of times in which any detected data has been detected falls below the predetermined threshold, said detected data that falls below the threshold is deemed to be a candidate for data that should be replaced with newly detected data in order to store said newly detected data.

* * * * *